United States Patent
Roberts

(10) Patent No.: US 8,807,931 B2
(45) Date of Patent: Aug. 19, 2014

(54) SYSTEM FOR IMPACT ZONE REINFORCEMENT

(75) Inventor: Herbert Chidsey Roberts, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1227 days.

(21) Appl. No.: 12/652,031

(22) Filed: Jan. 4, 2010

(65) Prior Publication Data
US 2011/0164986 A1 Jul. 7, 2011

(51) Int. Cl.
*F01D 9/02* (2006.01)
*F01D 5/28* (2006.01)

(52) U.S. Cl.
USPC ........ 415/200; 416/224; 416/230; 416/241 A; 428/295.1; 428/296.7; 428/297.1; 428/300.4; 428/300.7

(58) Field of Classification Search
USPC .......... 415/200; 416/224, 226, 229 R, 229 A, 416/230, 241 A; 428/295.1, 296.7, 297.1, 428/297.4, 300.4, 300.7
See application file for complete search history.

(56) References Cited

U.S. PATENT DOCUMENTS

| | | | |
|---|---|---|---|
| 2,698,666 A | 1/1955 | Camping et al. | |
| 3,028,292 A | 4/1962 | Hinds | |
| 3,528,753 A | 9/1970 | Dutton et al. | |
| 3,637,325 A | 1/1972 | Morley | |
| 3,762,835 A | 10/1973 | Farmer et al. | |
| 4,083,656 A * | 4/1978 | Braswell et al. | 416/226 |
| 4,255,949 A | 3/1981 | Thorneburg | |
| 5,085,559 A | 2/1992 | Stoffer et al. | |
| 5,392,514 A | 2/1995 | Cook et al. | |
| 5,425,538 A | 6/1995 | Vincent et al. | |
| 5,439,354 A | 8/1995 | Hansen et al. | |
| 5,486,096 A * | 1/1996 | Hertel et al. | 416/224 |
| 5,965,240 A | 10/1999 | Blackburn et al. | |
| 6,761,653 B1 | 7/2004 | Higginbotham et al. | |
| 8,075,279 B2 | 12/2011 | Ahmad et al. | |
| 2005/0053466 A1 | 3/2005 | Finn et al. | |
| 2006/0275626 A1 | 12/2006 | Bernard et al. | |
| 2009/0324401 A1 | 12/2009 | Calla | |
| 2010/0014982 A1 | 1/2010 | Haje | |
| 2010/0135816 A1 * | 6/2010 | Cairo | 416/226 |

FOREIGN PATENT DOCUMENTS

| | | |
|---|---|---|
| CN | 1847428 | 10/2006 |
| CN | 101131099 | 2/2008 |
| CN | 101570073 | 11/2009 |
| EP | 1788197 A1 | 5/2007 |

OTHER PUBLICATIONS

CN Office Action for Application No. 201110005657.3 Issued Mar. 5, 2014, 15 pages.
EP Search Report for Application No. 10196514.3 Mailed on Apr. 4, 2014, 9 pages.

* cited by examiner

*Primary Examiner* — Christopher Verdier
(74) *Attorney, Agent, or Firm* — Fletcher Yoder P.C.

(57) ABSTRACT

A system may include a structure having a leading edge and a fiber-reinforced composite cover. The fiber-reinforced composite cover may include a protective portion and a retaining portion, wherein the retaining portion extends about the structure to self-retain the protective portion along the leading edge, and the protective portion is different from the retaining portion.

20 Claims, 3 Drawing Sheets

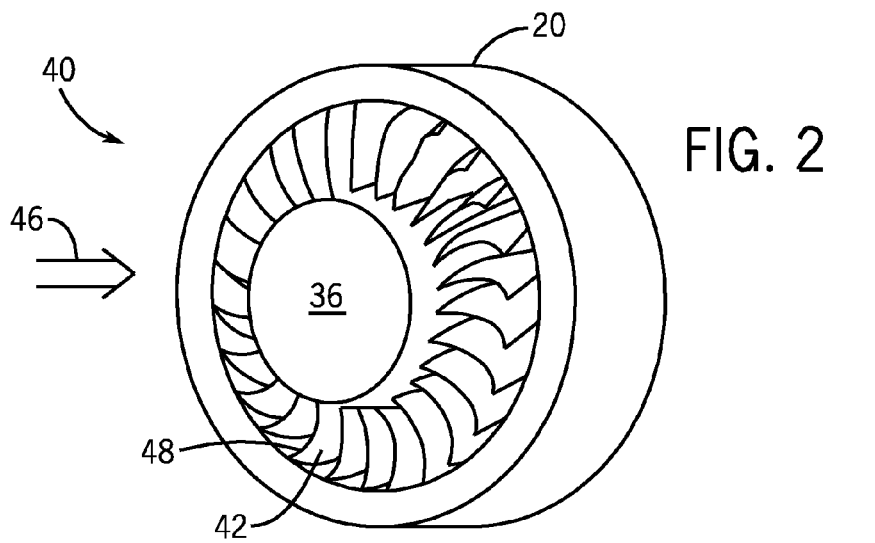
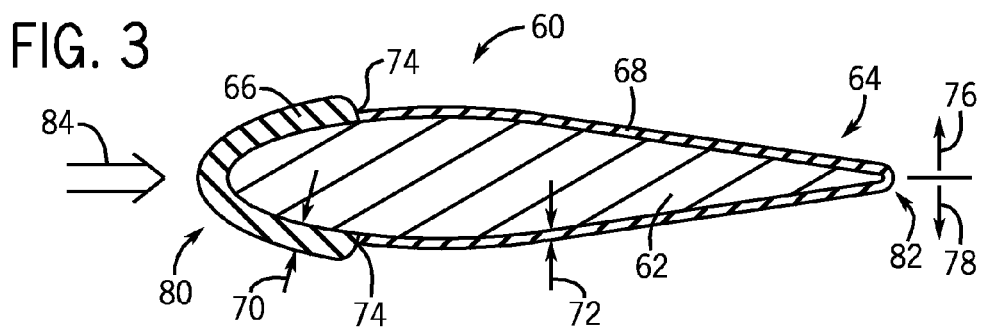
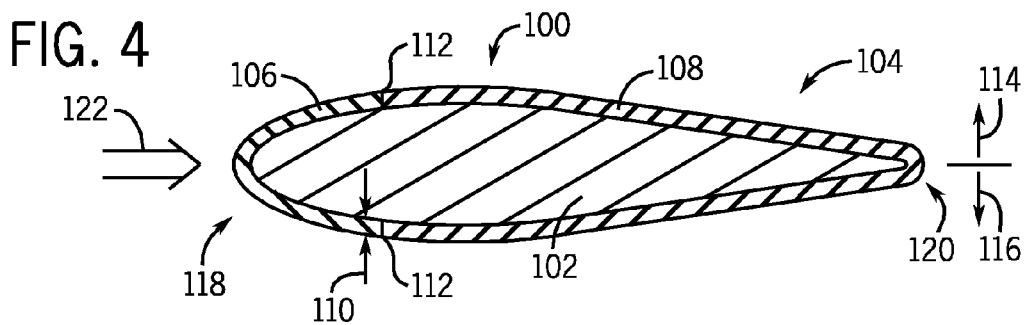
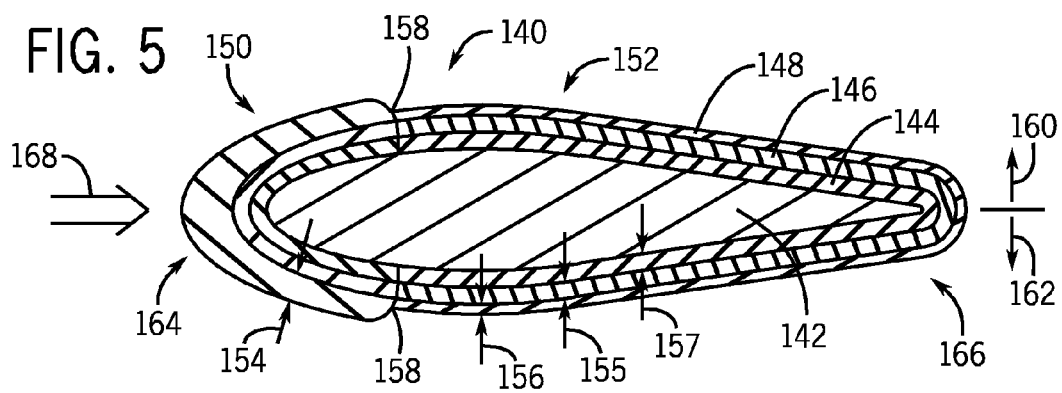

SYSTEM FOR IMPACT ZONE REINFORCEMENT

BACKGROUND OF THE INVENTION

The subject matter disclosed herein relates to turbine engines and impact-susceptible components. More particularly, the subject matter disclosed herein relates to impact zone reinforcement.

Turbine engines, rotary machines, aircraft, and other systems are susceptible to a possible impact by a foreign object. For example, a gas turbine engine on an aircraft may be susceptible to impact by rain, hail, birds, bugs, and other debris while in flight or on a runway. Unfortunately, an impact can cause significant damage to a leading edge of the stationary or moving parts. For example, debris may damage a leading edge of a rotary blade of a compressor stage or turbine stage in the gas turbine engine. The resulting damage may cause decreased performance, reduced life, and downtime of the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a structure having a leading edge and a fiber-reinforced composite cover having a protective portion and a retaining portion. The retaining portion extends about the structure to self-retain the protective portion along the leading edge. The protective portion is different from the retaining portion.

In a second embodiment, a system includes a fiber-reinforced composite cover having a protective portion and a retaining portion. The retaining portion has at least one loop configured to self-retain the fiber-reinforced composite cover about a structure. The protective portion is different from the retaining portion and the protective portion has a first fiber-reinforced composite.

In a third embodiment, a system includes a turbine engine having a rotary blade with an edge and a fiber-reinforced composite cover having a protective portion and a retaining portion defining at least one loop. The at least one loop extends about the rotary blade to self-retain and self-conform the protective portion along the edge. The protective portion has a first fiber-reinforced composite. The protective portion and the retaining portion have different materials, different thickness, different hardnesses, or different densities, relative to one another.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a front view of a turbine, as shown in FIG. 1, having various components made with a fiber-reinforced composite cover in accordance with an embodiment of the present technique;

FIG. 3 is a cross-sectional view of a turbine blade, as shown in FIG. 2, illustrating an embodiment of a fiber-reinforced composite cover with protective and reinforcing portions of different thicknesses;

FIG. 4 is a cross-sectional view of a turbine blade, as shown in FIG. 2, illustrating an embodiment of a fiber-reinforced composite cover with protective and reinforcing portions of uniform thickness;

FIG. 5 is a cross-sectional view of a turbine blade, as shown in FIG. 2, illustrating an embodiment of a fiber-reinforced composite cover with three layers of fiber-reinforced composite covers;

DETAILED DESCRIPTION OF THE INVENTION

Figure 1:
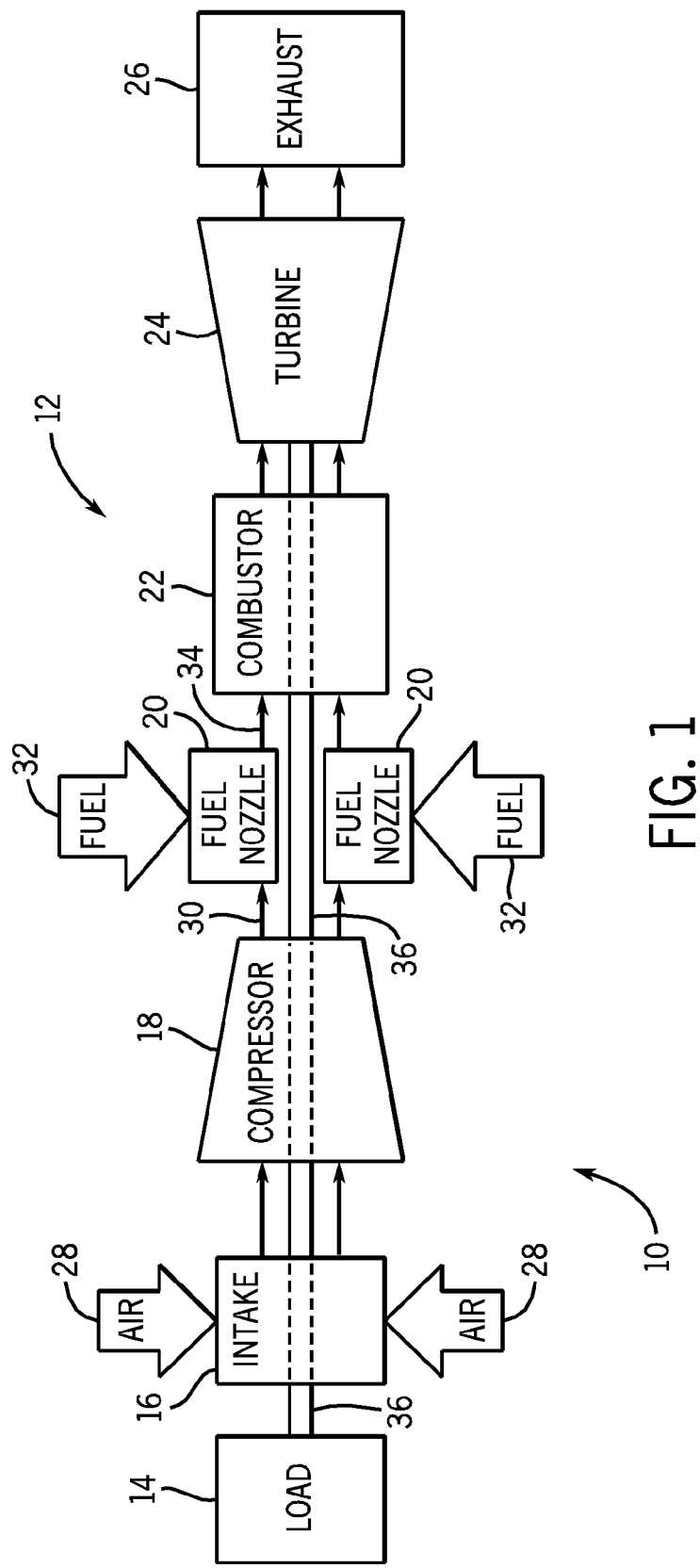
FIG. 1 is a block diagram of a turbine system having various components made with a fiber-reinforced composite cover in accordance with an embodiment of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a self-retaining, self-conforming composite cover disposed along a leading edge of a structure susceptible to potential impact by a foreign object in a fluid flow (e.g., liquid or gas). The structure may include a machine, a vehicle, or a moving part. For example, the structure may include a turbine engine, a rotary blade or impellor (e.g., compressor, turbine, or pump), a stationary vane (e.g., compressor, turbine, or pump), an airfoil or aerodynamic surface, an aircraft, a watercraft, an automotive vehicle, and so forth. A composite material is an engineered material made from two or more constituent materials with different characteristics. For example, a composite material may include a matrix material that supports and surrounds a reinforcing material. The composite material may possess properties not present in the constituent materials, such as increased strength, impact resistance, or heat resistance. In certain embodiments, a fiber-reinforced composite cover may be disposed about the structure, wherein the composite material includes fibers distributed in a matrix material. For example, the fiber-reinforced composite cover may include a protective portion coupled to a retaining portion to define an integral loop about the structure.

The protective and retaining portions may have similar or different material compositions, thicknesses, hardnesses, fiber volumes, and other characteristics. For example, the protective portion may be made of a first material and the retaining portion may be made of a second material. In some embodiments, the first and second materials may be made of similar or different composite materials, e.g., fiber-reinforced composite materials. In other embodiments, the first material may be made of a composite material (e.g., fiber-reinforced composite material), whereas the second material is not a composite material. By further example, the first material may have a hardness, an impact resistance, a fiber volume, a thickness, a chemical resistance, a wear resistance, or a general protective characteristic that is a multiplier of (or a percentage greater than) the second material. The multiplier may range between approximately 1.1 to 50, 1.1 to 25, 1.1 to 10, or 1.1 to 5, or any other suitable multiplier. The second material also may have a density, elasticity, resiliency, or flexibility that is a multiplier of (or a percentage greater than) the first material. The multiplier may range between approximately 1.1 to 4, 1.1 to 3, or 1.1 to 2, or any other suitable multiplier.

The protective portion of the fiber-reinforced composite cover may comprise a material with high strength and/or high impact resistance to reduce the possibility of damage caused by foreign object strikes. Examples of fibers that may be used in the protective portion include, but are not limited to, para-aramid fibers (e.g. poly-paraphenylene terephthalamide), other polymer fibers, metal fibers, ceramic fibers, carbon fibers, glass fibers, or combinations thereof. More generally, the protective portion may comprise any fiber-reinforced composite material having a plurality of fibers disposed in a matrix material, such as epoxy, metal powder, or ceramic powder. The fiber-reinforced composite material may be installed using pre-impregnated ("pre-preg") fibers, or applying the matrix material separately after applying the fibers, or any other suitable technique.

The retaining portion may differ from the protective portion, because instead of a function of protecting the structure, the retaining portion has a function of holding the protective portion tightly in place without external fasteners or assistance (i.e., it self-retains) while the matrix material sets. In other words, the retaining portion adds a self-retaining characteristic to the fiber reinforced composite cover, thereby eliminating the need for external or separate retainers, fasteners, or manual retention by a person while the matrix material sets. Examples of fibers that may be used in the retaining portion that are different from those used in the protective portion include, but are not limited to, polymer fibers, carbon fibers, glass fibers, natural rubber, ethylene propylene diene monomer (EPDM) rubber, polyurethane, or combinations thereof. The retaining portion is unlikely to damage the protective portion during the setting process because an intermediate interface integrally joins the two portions together, without extending over the protective portion. Thus, the protective portion is generally not subjected to non-uniform external forces. The retaining portion may possess a greater elasticity than the protective portion to help hold the protective portion tighter against the structure, while also reducing the possibility of any undesirable movement as the matrix material sets. Elasticity refers to the ability of a material to recover its original size and shape after removal of a force. In certain embodiments, the Young's modulus (a measure of the stiffness of an elastic material) of the protective portion may be between approximately 120 and 145 gigapascals (GPa) and the Young's modulus of the retaining portion may be between approximately 75 and 85 GPa. For example, the Young's modulus of the protective portion may be approximately 25 to 150%, 25 to 100%, 25 to 75%, or 25 to 50% greater than the Young's modulus of the retaining portion. Furthermore, the retaining portion helps the protective portion to conform closely to the contours of an irregularly shaped or complex structure, such as a turbine blade, without any folding or kinking of the protective portion. Any part of the retaining portion may be removed or trimmed after the protective portion has set onto the structure.

The integral loop, as defined by the protective portion and the retaining portion, self-retains the fiber-reinforced composite cover about the structure while the composite material (e.g., fiber-reinforced composite material) cures or hardens directly onto the structure. Thus, the self-retaining aspect of the integral loop may eliminate use of separate straps, separate fasteners, separate adhesives, or manual retention by a person while the composite material cures or hardens. The integral loop also self-conforms the fiber-reinforced composite cover directly onto the contours (e.g., curves, dips, protrusions, etc.) of the structure, thereby improving the contact and increasing the continuity of adhesion with the structure. In other words, the self-conforming aspect may substantially reduce or eliminate gaps between the fiber-reinforced composite cover and the structure, thereby maintaining the original contours of the structure and improving the overall connection. For example, the integral loop improves the uniformity of force distribution onto the fiber-reinforced composite cover, thereby providing more uniform compression of the fiber-reinforced composite cover around the structure.

FIG. 1 is a block diagram of an embodiment of a turbine system 10, which may include a variety of components (e.g., rotating blades, stationary vanes, etc.) constructed with a fiber-reinforced composite cover as described below. In the illustrated embodiment, the turbine system 10 includes a turbine engine 12 coupled to a load 14, e.g., an electrical generator. In one embodiment, the turbine engine 12 may be a 7FA gas turbine engine manufactured by General Electric Company, Schenectady, N.Y. The turbine engine 12 includes an air intake 16, a compressor 18, one or more fuel nozzles 20, a combustor 22, a turbine 24, and an exhaust 26. As appreciated, the compressor 18 may include any number of stages, e.g., 1 to 20 stages, of compressor blades rotatable in shrouds Likewise, the turbine 24 may include any number of stages, e.g., 1 to 20 stages, of turbine blades rotatable in shrouds. The combustor 18 also may include a single combustor or multiple combustors (e.g., 2 to 10).

In operation, the turbine engine 12 routes air 28 through the air intake 16 and the compressor 18, which generates compressed air 30 for combustion and cooling flows. In the illustrated embodiment, the fuel nozzles 20 receive at least a portion of the compressed air 30 and a fuel 32, which are then directed into a combustion zone of the combustor 22 as indicated by arrows 34. A portion of the compressed air 30 also may flow along the combustor 22 and/or the turbine 24 for cooling purposes. Inside the combustor 22, the air 30 and the fuel 32 mix and combust to generate hot products of combustion, which then flow into and through the turbine 24 and the exhaust 26. These combustion gases drive turbine blades to rotate within the turbine 24, thereby driving a shaft 36 to rotate the compressor 18 and the load 14.

FIG. 2 is a front view of an embodiment of a rotor assembly 40 of the turbine 24 of FIG. 1. In the illustrated embodiment, the rotor assembly 40 includes a plurality of turbine blades 42 mounted in a circumferential arrangement about the shaft 36. Directional arrow 46 indicates a downstream direction of the combustion gases toward the turbine blades 42. In operation, a leading edge 48 of each turbine blade 42 is susceptible to damage by foreign objects potentially carried into the turbine 24. In certain embodiments, a composite material may reinforce the leading edges 48 of the turbine blades 42 and various other moving or stationary components of the turbine 24, and/or the compressor 18, or any other components of the turbine system 10 that may be susceptible to foreign object damage.

FIG. 3 is a cross-sectional view of an embodiment of a composite reinforced turbine blade 60 having a fiber-reinforced composite cover 64 surrounding a turbine blade 62. In the illustrated embodiment, the cover 64 comprises a protective portion 66 and a retaining portion 68, which differ in certain respects. For example, in certain embodiments, the thicknesses of the two portions 66 and 68 may differ as illustrated by a thickness 70 of protective portion 66 being greater than a thickness 72 of retaining portion 68. In certain embodiments, the thickness 70 of the protective portion 66 may be between approximately 3 and 9 millimeters (mm) per layer, with an overall assembly thickness between 20 and 90 mm, and the thickness 72 of the retaining portion 68 may be between approximately 3 and 7 mm. For example, the thickness 70 of protective portion 66 may be approximately 100 to 3,000%, 100 to 1,500%, 100 to 1,000%, or 100 to 500% greater than the thickness 72 of the retaining portion 68. The increased thickness 70 of the protective portion 66 may help make it more resistant to the effect of potential strikes from foreign objects. In addition, the protective portion 66 may comprise a first fiber-reinforced composite, whereas the retaining portion 68 may or may not comprise a fiber-reinforced composite. For example, the retaining portion 68 may include a different fiber-reinforced composite or a material solely for retention. An interface 74 joins the two portions 66 and 68 together.

The turbine blade 62 comprises an upper surface 76 and a lower surface 78. The fiber-reinforced composite cover 64 surrounds both the upper surface 76 and lower surface 78, such that the cover 64 extends completely about the turbine blade 62. In other words, the cover 64 encircles the turbine blade 62 continuously 360 degrees around the upper and lower surfaces 76 and 78. For example, the protective portion 66 and the retaining portion 68 are coupled at the interface 74 to define a complete loop or circle about the circumference of the turbine blade 62. As discussed below, the loop defined by the protective portion 66 and the retaining portion 68 is configured to self-retain the cover 64 on the turbine blade 62 during composite curing without external or separate fasteners or manual retention by a person. In reference to the gases 84 flowing downstream onto the turbine blade 62, the blade 62 comprises a leading edge 80 and a trailing edge 82. The protective portion 66 covers the leading edge 80. The retaining portion 68 covers the rest of turbine blade 62, which includes the trailing edge 82, in order to self-retain the protective portion 66 along the leading edge 80.

FIG. 4 is a cross-sectional view of another embodiment of a composite reinforced turbine blade 100 having a fiber-reinforced composite cover 104 surrounding a turbine blade 102. In the illustrated embodiment, the cover 104 comprises a protective portion 106 and a retaining portion 108, which differ in certain respects. For example, in certain embodiments, the protective portion 106 may comprise a first fiber-reinforced composite that is more resistant to the effect of potential strikes from foreign objects than a second fiber-reinforced composite used for the retaining portion 108. For this reason, the first and second fiber-reinforced composites may comprise different materials than one another, the first composite may have a greater fiber volume or hardness than the second composite, or the second composite may have a greater density than the first composite. The fiber volume refers to the percentage of fibers per unit volume of a composite material, the hardness refers to a material's resistance to permanent indentation as measured by its durometer, and the density refers to the mass per unit volume. In certain embodiments, the fiber volume of the protective portion 106 may be between approximately 40 and 70% fiber volume and the fiber volume of the retaining portion 108 may be between approximately 15 and 30% fiber volume. For example, the fiber volume of protective portion 106 may be approximately 25 to 400%, 25 to 200%, 25 to 100%, or 25 to 50% greater than the fiber volume of the retaining portion 108. In certain embodiments, the hardness of the protective portion 106 may be between approximately 75 and 85 Shore D and the hardness of the retaining portion 108 may be between approximately 50 and 75 Shore A. As appreciated, Shore D is used for harder materials than Shore A. In certain embodiments, the density of the protective portion 106 may be between approximately 1.3 and 1.5 grams per cubic centimeter (g/cm$^3$) and the density of the retaining portion 108 may be between approximately 2 and 3 g/cm$^3$. For example, the density of retaining portion 108 may be approximately 25 to 150%, 25 to 100%, or 25 to 50% greater than the density of the protective portion 106. In addition, the protective portion 106 may comprise a first fiber-reinforced composite, whereas the retaining portion 108 may or may not comprise a fiber-reinforced composite. For example, the retaining portion 106 may include a different fiber-reinforced composite or a material solely for retention. In the illustrated embodiment, the thicknesses of the two portions 106 and 108 are the same as illustrated by a thickness 110. An interface 112 joins the two portions 106 and 108 together.

The turbine blade 102 comprises an upper surface 114 and a lower surface 116. The fiber-reinforced composite cover 104 surrounds both the upper surface 114 and lower surface 116, such that the cover 104 extends completely about the turbine blade 102. In other words, the cover 104 encircles the turbine blade 102 continuously 360 degrees around the upper and lower surfaces 114 and 116. For example, the protective portion 106 and the retaining portion 108 are coupled at the interface 112 to define a complete loop or circle about the circumference of the turbine blade 102. As discussed below, the loop defined by the protective portion 106 and the retaining portion 108 is configured to self-retain the cover 104 on the turbine blade 102 during composite curing without external or separate fasteners or manual retention by a person. In reference to the gases 122 flowing downstream onto the turbine blade 102, the blade 102 comprises a leading edge 118 and a trailing edge 120. The protective portion 106 covers the leading edge 118. The retaining portion 108 covers the rest of turbine blade 102, which includes the trailing edge 120, in order to self-retain the protective portion 106 along the leading edge 118.

FIG. 5 is a cross-sectional view of another embodiment of a composite reinforced turbine blade 140 having three fiber-reinforced composite covers surrounding a turbine blade 142:

an inner cover 144, a middle cover 146, and an outer cover 148. By using a plurality of covers 144, 146, and 148, which define multiple layers along a leading edge 164 of the turbine blade 142, the manufacturer can customize the amount of protection. In the illustrated embodiment, each cover 144, 146, and 148 comprises a protective portion 150 and a retaining portion 152, which differ in certain respects. In certain embodiments, the thicknesses of the two portions 150 and 152 may differ as illustrated by a thickness 154 of protective portion 150 being greater than a thickness 156 of retaining portion 152 of the outer layer 148. In certain embodiments, the thickness 154 of the protective portion 150 may be between approximately 3 and 9 mm per layer, with an overall assembly thickness between 20 and 90 mm, and the thickness 156 of the retaining portion 152 may be between approximately 3 and 7 mm. For example, the thickness 154 of protective portion 150 may be approximately 10 to 2,000%, 10 to 1,000%, 10 to 250%, or 10 to 100% greater than the thickness 156 of the retaining portion 152. The increased thickness 154 of the protective portion 150 may help make it more resistant to the effect of potential strikes from foreign objects. In other embodiments, the thicknesses of the two portions 150 and 152 for a particular layer may be the same as illustrated by a thickness 155 of middle layer 146 and a thickness 157 of inner layer 144.

In still further embodiments, the protective portion 150 may comprise a first fiber-reinforced composite that is more resistant to the effect of strikes from foreign objects than the second fiber-reinforced composite used for the retaining portion 152. For this reason, the first and second fiber-reinforced composites may comprise different materials than one another, the first composite may have a greater fiber volume or hardness than the second composite, or the second composite may have a greater density than the first composite. Specific examples of characteristics of the first and second fiber-reinforced composites are discussed above with respect to FIG. 4. In addition, the protective portion 150 may comprise a first fiber-reinforced composite, whereas the retaining portion 152 may or may not comprise a fiber-reinforced composite. For example, the retaining portion 150 may include a different fiber-reinforced composite or a material solely for retention. An interface 158 joins the two portions 150 and 152 together.

The turbine blade 142 comprises an upper surface 160 and a lower surface 162. The three layers of fiber-reinforced composite covers 144, 146, and 148 surround both the upper surface 160 and lower surface 162, such that the covers extend completely about the turbine blade 142. In other words, the covers 144, 146, and 148 encircle the turbine blade 142 continuously 360 degrees around the upper and lower surfaces 160 and 162. For example, the protective portion 150 and the retaining portion 152 are coupled at the interface 158 to define a complete loop or circle about the circumference of the turbine blade 142. As discussed below, the loop defined by the protective portion 150 and the retaining portion 152 is configured to self-retain the covers 144, 146, and 148 on the turbine blade 142 during composite curing without external or separate fasteners or manual retention by a person. In reference to the gases 168 flowing downstream onto the turbine blade 142, the blade 142 comprises a leading edge 164 and a trailing edge 166. The protective portion 150 covers the leading edge 164. The retaining portion 152 covers the rest of turbine blade 142, which includes the trailing edge 166, in order to self-retain the protective portion 150 along the leading edge 164.

Figure 6:
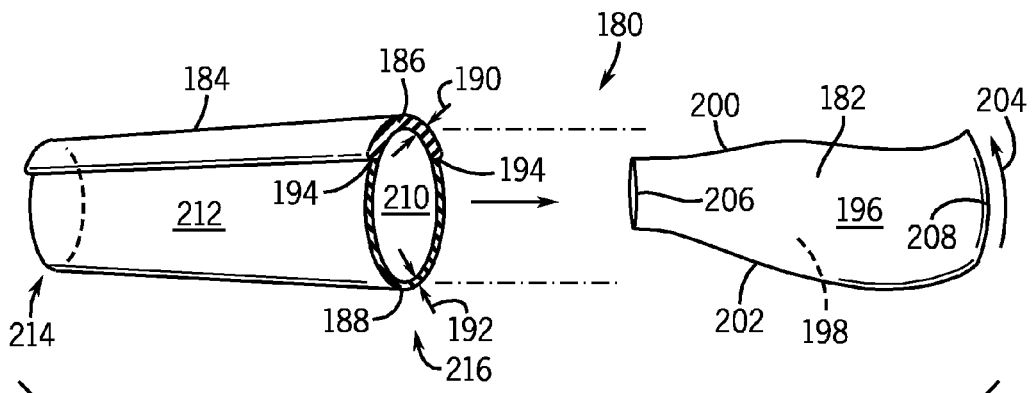
FIG. 6 is a partial perspective view of a turbine blade, as shown in FIG. 2, illustrating an embodiment of a fiber-reinforced composite cover sleeve prior to installation on the turbine blade.

FIG. 6 is a partial perspective view of an embodiment of a composite reinforced turbine blade 180 having a fiber-reinforced composite cover 184 prior to installation on a turbine blade 182. In the illustrated embodiment, the cover 184 comprises a sleeve (e.g. an elongated loop) defined by a protective portion 186 and a retaining portion 188, which differ in certain respects. For example, in certain embodiments, the thicknesses of the two portions 186 and 188 may differ as illustrated by a thickness 190 of protective portion 186 being greater than a thickness 192 of retaining portion 188. Specific examples of thicknesses of the two portions 186 and 188 are discussed above with respect to FIG. 3. An interface 194 joins the two portions 186 and 188 together. The cover 184 comprises an inner surface 210 and an outer surface 212. The cover 184 further comprises a hub side opening 214 and a tip side opening 216. The cover 184 may be a complete loop along the entire length between the hub side opening 214 and the tip side opening 216.

The turbine blade 182 comprises an upper surface 196 and a lower surface 198. The cover 184 surrounds both the upper surface 196 and lower surface 198, such that the cover 184 extends completely about the turbine blade 182. In other words, the cover 184 encircles the turbine blade 182 continuously 360 degrees around the upper and lower surfaces 196 and 198. For example, the protective portion 186 and the retaining portion 188 are coupled at the interface 194 to define a complete loop or circle about the circumference of the turbine blade 182. As discussed below, the loop defined by the protective portion 186 and the retaining portion 188 is configured to self-retain the cover 184 on the turbine blade 182 during composite curing without external or separate fasteners or manual retention by a person. In reference to a direction of motion 204 (e.g., rotation) of the turbine blade 182, the blade comprises a leading edge 200 and a trailing edge 202. The turbine blade 182 further comprises a hub connection 206 and a blade tip 208. The cover 184 may be installed over the blade 182 by sliding the tip side opening 216 over the hub connection 206 until the opening 216 reaches the blade tip 208. After installation of the cover 184, the protective portion 186 covers the leading edge 200. The retaining portion 188 covers the rest of turbine blade 182, which includes the trailing edge 202, in order to self-retain the protective portion 186 along the leading edge 200. After the cover 184 is self-retained on the turbine blade 182, the protective portion 186 and (in some embodiments) the retaining portion 188 may be cured or hardened directly onto the turbine blade 182. Thus, the loop defined by the protective portion 186 and the retaining portion 188 self-retains the cover 184 during curing without any external straps, fasteners, or manual assistance by a person.

Figure 7:
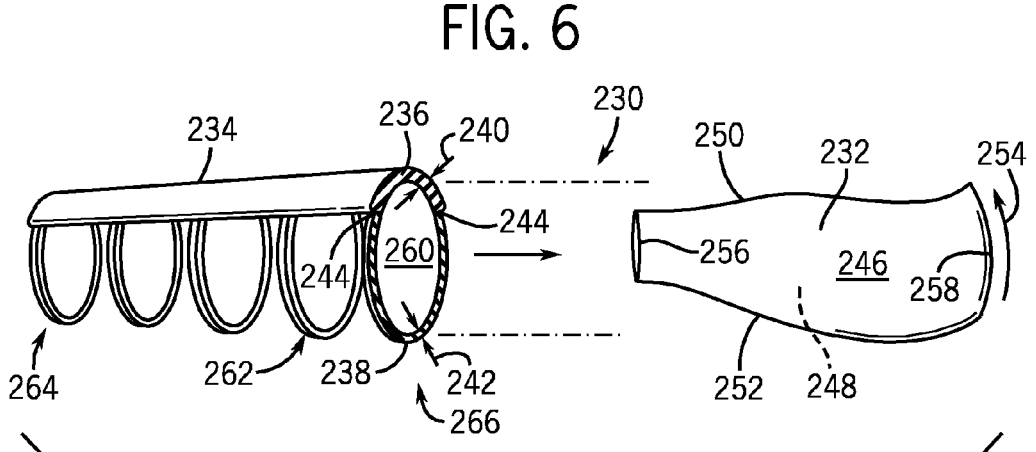
FIG. 7 is a partial perspective view of a turbine blade, as shown in FIG. 2, illustrating an embodiment of a fiber-reinforced composite cover with loops prior to installation on the turbine blade.

FIG. 7 is a partial perspective view of an embodiment of a composite reinforced turbine blade 230 having another fiber-reinforced composite cover 234 prior to installation on a turbine blade 232. In the illustrated embodiment, the cover 234 comprises a protective portion 236 and a retaining portion 238, which differ in certain respects. For example, in certain embodiments, the thicknesses of the two portions 236 and 238 may differ as illustrated by a thickness 240 of protective portion 236 being greater than a thickness 242 of retaining portion 238. Specific examples of thicknesses of the two portions 236 and 238 are discussed above with respect to FIG. 3. An interface 244 joins the two portions 236 and 238 together. The cover 234 comprises a plurality of loops 262 each comprising an opening 260, the protective portion 236, and the retaining portion 238. In certain embodiments, the retaining portion 238 of the loops 262 define first U-shaped loops, and the protective portion 236 defines a second U-shaped loop. Together, the first and second U-shaped loops define a complete O-shaped loop or loops. However, certain embodiments of the loops 262 are complete O-shaped loops defined by the retaining portion 238, which overlaps the protective portion 236. In some embodiments, the cover 234 may only comprise one loop based on the size or configuration of the turbine blade 232. The cover 234 further comprises a hub side loop 264 and a tip side loop 266.

The turbine blade 232 comprises an upper surface 246 and a lower surface 248. The cover 234 surrounds both the upper surface 246 and lower surface 248, such that the cover 234 extends completely about the turbine blade 232. In other words, the cover 234 encircles the turbine blade 232 continuously 360 degrees around the upper and lower surfaces 246 and 248. For example, the protective portion 236 and the retaining portion 238 are coupled at the interface 244 to define a complete loop or circle about the circumference of the turbine blade 232. As discussed below, the loop defined by the protective portion 236 and the retaining portion 238 is configured to self-retain the cover 234 on the turbine blade 232 during composite curing without external or separate fasteners or manual retention by a person. In reference to a direction of motion 254 (e.g., rotation) of the turbine blade 232, the blade 232 comprises a leading edge 250 and a trailing edge 252. The turbine blade 232 further comprises a hub connection 256 and a blade tip 258. The cover 234 may be installed over the blade 232 by sliding the tip side loop 266 over the hub connection 256 until the loop 266 reaches the blade tip 258. After installation of the cover 234, the protective portion 236 covers the leading edge 250. In addition, the retaining portion 238 covers the rest of turbine blade 232, which includes the trailing edge 252, in order to self-retain the protective portion 236 along the leading edge 250. After the cover 234 is self-retained on the turbine blade 232, the protective portion 236 and (in some embodiments) the retaining portion 238 may be cured or hardened directly onto the turbine blade 232. Thus, the loop defined by the protective portion 236 and the retaining portion 238 self-retains the cover 234 during curing without any external straps, fasteners, or manual assistance by a person.

Figure 8:
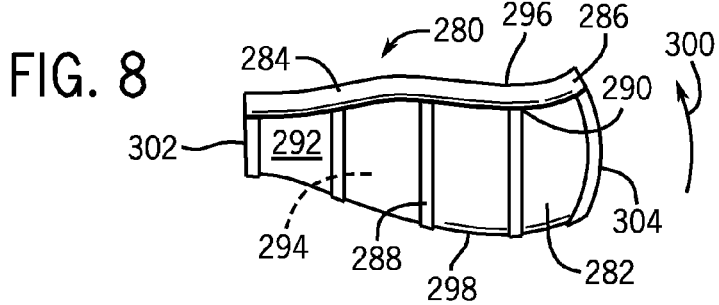
FIG. 8 is a side view of a turbine blade, as shown in FIG. 2, illustrating an embodiment of a fiber-reinforced composite cover with loops subsequent to installation on the turbine blade.

FIG. 8 is a top view of an embodiment of a composite reinforced turbine blade 280 having a fiber-reinforced composite cover 284 similar to that represented in FIG. 7 subsequent to installation on a turbine blade 282. In the illustrated embodiment, the cover 284 comprises a protective portion 286 and a retaining portion 288, coupled to define a plurality of integral loops. In this embodiment, the retaining portion 288 of the loops extends straight back from the protective portion 286 without overlapping. An interface 290 joins the two portions 286 and 288 together. The turbine blade 282 comprises an upper surface 292 and a lower surface 294. The cover 284 surrounds both the upper surface 292 and lower surface 294, such that the cover 284 extends completely about the turbine blade 282. In reference to a direction of motion 300 (e.g., rotation) of the turbine blade 282, the blade comprises a leading edge 296 and a trailing edge 298. The turbine blade 282 further comprises a hub connection 302 and a blade tip 304. The protective portion 286 covers the leading edge 296 and the retaining portion 288 covers the rest of turbine blade 282, which includes the trailing edge 298, in order to self-retain the protective portion 286 along the leading edge 296. After the cover 284 is self-retained on the turbine blade 282, the protective portion 286 and (in some embodiments) the retaining portion 288 may be cured or hardened directly onto the turbine blade 282. Thus, the loop defined by the protective portion 286 and the retaining portion 288 self-retains the cover 284 during curing without any external straps, fasteners, or manual assistance by a person.

Figure 9:
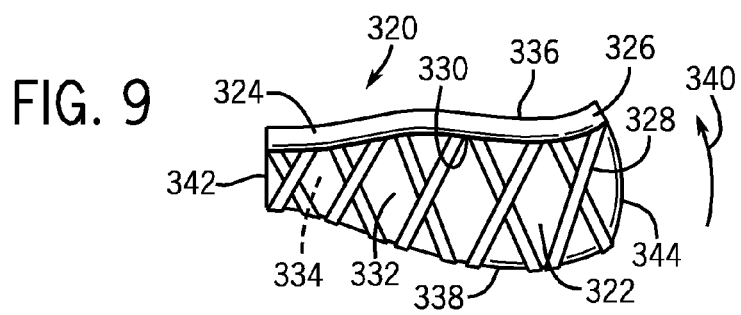
FIG. 9 is a side view of a turbine blade, as shown in FIG. 2, illustrating an embodiment of a fiber-reinforced composite cover with overlapping loops subsequent to installation on the turbine blade.

FIG. 9 is a top view of an embodiment of a composite reinforced turbine blade 320 having another fiber-reinforced composite cover 324 subsequent to installation on a turbine blade 322. In the illustrated embodiment, the cover 324 comprises a protective portion 326 and a retaining portion 328, coupled to define a plurality of integral loops. In this embodiment, the retaining portion 328 of the loops overlap each other (e.g., crisscross pattern) to facilitate a tight fit of the protective portion 326 to the turbine blade 322 and to prevent the possibility of any undesirable movement. An interface 330 joins the two portions 326 and 328 together. The turbine blade 322 comprises an upper surface 332 and a lower surface 334. The cover 324 surrounds both the upper surface 332 and lower surface 334, such that the cover 324 extends completely about the turbine blade 322. In reference to a direction of motion 340 (e.g., rotation) of the turbine blade 322, the blade comprises a leading edge 336 and a trailing edge 338. The turbine blade 322 further comprises a hub connection 342 and a blade tip 344. The protective portion 326 covers the leading edge 336 and the retaining portion 328 covers the rest of turbine blade 322, which includes the trailing edge 338, in order to self-retain the protective portion 326 along the leading edge 336. After the cover 324 is self-retained on the turbine blade 322, the protective portion 326 and (in some embodiments) the retaining portion 328 may be cured or hardened directly onto the turbine blade 322. Thus, the loop defined by the protective portion 326 and the retaining portion 328 self-retains the cover 324 during curing without any external straps, fasteners, or manual assistance by a person.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a structure having a leading edge; wherein the structure comprises an airfoil, a rotary blade, a stationary vane of a rotary machine, or a combination thereof; and
   a fiber-reinforced composite cover comprising a protective portion and a retaining portion, wherein the retaining portion extends about the structure to self-retain the protective portion along the leading edge, the protective portion is different from the retaining portion, the protective portion comprises an outermost layer of the fiber-reinforced composite cover, and first edges of the protective portion are coupled to second edges of the retaining portion without overlap of the first and second edges.

2. The system of claim 1, wherein the protective portion comprises a first fiber-reinforced composite.

3. The system of claim 2, wherein the retaining portion comprises a second fiber-reinforced composite.

4. The system of claim 3, wherein the first and second fiber-reinforced composites comprise different materials than one another.

5. The system of claim 3, wherein the first fiber-reinforced composite has a thickness greater than the second fiber-reinforced composite.

6. The system of claim 3, wherein the first fiber-reinforced composite has a fiber volume greater than the second fiber-reinforced composite.

7. The system of claim 3, wherein the first fiber-reinforced composite, or the second fiber-reinforced composite, or both, comprise para-aramid fibers disposed in a matrix material.

8. The system of claim 1, wherein the fiber-reinforced composite cover comprises a sleeve defined by the protective portion and the retaining portion.

9. The system of claim 1, wherein the retaining portion comprises a plurality of loops coupled to the protective portion.

10. The system of claim 1, comprising a turbine engine, an aircraft, or a combination thereof, having the structure and the fiber-reinforced composite cover.

11. A system, comprising:
a fiber-reinforced composite cover comprising a protective portion and a retaining portion, wherein the fiber-reinforced composite cover comprises at least one loop, the retaining portion is configured to self-retain the fiber-reinforced composite cover about a structure, with the protective portion comprising an outermost layer of the fiber-reinforced composite cover, the protective portion is different from the retaining portion, the protective portion comprises a first fiber-reinforced composite, and first edges of the protective portion are coupled to second edges of the retaining portion without overlap of the first and second edges.

12. The system of claim 11, wherein the first fiber-reinforced composite comprises a plurality of fibers disposed in a matrix material, and the plurality of fibers comprises metal fibers, ceramic fibers, polymer fibers, or a combination thereof.

13. The system of claim 11, wherein the retaining portion comprises a second fiber-reinforced composite, wherein the first and second fiber-reinforced composites comprise different materials, different thicknesses, different hardnesses, or different fiber volumes, relative to one another.

14. The system of claim 11, wherein the fiber-reinforced composite cover comprises a sleeve defined by the protective portion and the retaining portion.

15. The system of claim 11, wherein the retaining portion comprises a plurality of loops configured to self-retain the fiber-reinforced composite cover about the structure.

16. The system of claim 11, comprising the structure, wherein the structure comprises an airfoil, a rotary blade, a stationary vane of a rotary machine, or a combination thereof.

17. A system, comprising:
a turbine engine comprising a rotary blade having an edge; and
a fiber-reinforced composite cover comprising a protective portion and a retaining portion defining at least one loop, wherein the at least one loop extends about the rotary blade to self-retain and self-conform the protective portion along the edge, the protective portion comprises a first fiber-reinforced composite, the protective portion and the retaining portion comprise different materials, different thickness, different hardnesses, or different densities, relative to one another, and the protective portion comprises an outermost layer of the fiber-reinforced composite cover.

18. The system of claim 17, wherein the retaining portion comprises a second fiber-reinforced composite, wherein the first and second fiber-reinforced composites comprise different materials, different thicknesses, different hardnesses, or different fiber volumes, relative to one another.

19. The system of claim 17, comprising a plurality of fiber-reinforced composite covers disposed about the rotary blade to define multiple layers along the edge.

20. The system of claim 17, wherein the retaining portion has a greater elasticity than the protective portion.

* * * * *